US012175602B2

(12) United States Patent
Herling et al.

(10) Patent No.: US 12,175,602 B2
(45) Date of Patent: Dec. 24, 2024

(54) METHOD OF GENERATING A VIRTUAL ENVIRONMENT BY SCANNING A REAL-WORLD ENVIRONMENT WITH A FIRST DEVICE AND DISPLAYING THE VIRTUAL ENVIRONMENT ON A SECOND DEVICE

(71) Applicant: Meta Platforms Technologies, LLC, Menlo Park, CA (US)

(72) Inventors: Jan Herling, Seattle, WA (US); Nils Plath, Seattle, WA (US); Jan-Michael Frahm, Seattle, WA (US); Ahmad Al-Dahle, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 48 days.

(21) Appl. No.: 17/891,984

(22) Filed: Aug. 19, 2022

(65) Prior Publication Data
US 2024/0062472 A1    Feb. 22, 2024

(51) Int. Cl.
*G06T 13/40* (2011.01)
*G02B 27/01* (2006.01)
(Continued)

(52) U.S. Cl.
CPC .......... *G06T 19/003* (2013.01); *G02B 27/017* (2013.01); *G06F 3/011* (2013.01);
(Continued)

(58) Field of Classification Search
CPC .............. G06F 3/011; G02B 27/017; G02B 2027/0138; G06T 19/003; G06T 13/40;
(Continued)

(56) References Cited

U.S. PATENT DOCUMENTS 6,842,175 B1   1/2005   Schmalstieg et al.
8,812,954 B2   8/2014   Shuster et al.
(Continued)

FOREIGN PATENT DOCUMENTS

CN    105190703 A    12/2015
CN    107209950 A     9/2017
(Continued)

OTHER PUBLICATIONS

International Search Report and Written Opinion for International Application No. PCT/US2019/017947, mailed Nov. 28, 2019, 17 Pages.
(Continued)

*Primary Examiner* — Jacinta M Crawford
(74) *Attorney, Agent, or Firm* — Potomac Law Group PLLC; Dannon G. Allbee

(57) ABSTRACT

In one embodiment, a method includes scanning a real-world environment with a first device associated with a first user; generating a three-dimensional model of the real-world environment, transmitting the three-dimensional model to a head-mounted device associated with the first user, determining a pose of the head-mounted device by localizing the head-mounted device within the three-dimensional model based on images captured by a second camera of the head-mounted device, displaying, on the head-mounted device, a virtual space corresponding to the scanned real-world environment generated based on the three-dimensional model as viewed from the pose, and transmitting, to a remote head-mounted device of a second user, data corresponding to the three-dimensional model and the pose of the head-mounted device, the data being configured for rendering, by the remote head-mounted device, the virtual space with a first avatar corresponding to the first user having the pose.

20 Claims, 10 Drawing Sheets

(51) Int. Cl.
*G06F 3/01* (2006.01)
*G06T 19/00* (2011.01)
*G06T 19/20* (2011.01)

(52) U.S. Cl.
CPC .............. *G06T 13/40* (2013.01); *G06T 19/20* (2013.01); *G02B 2027/0138* (2013.01)

(58) Field of Classification Search
CPC ......... G06T 19/20; G06T 17/00; G06T 19/00; G06T 2210/61; G06T 2219/024
USPC .................................................. 345/419, 633
See application file for complete search history.

(56) References Cited

U.S. PATENT DOCUMENTS

| | | |
|---|---|---|
| 9,047,706 B1 | 6/2015 | Ogale |
| 9,323,325 B2 | 4/2016 | Perez et al. |
| 9,814,982 B2 | 11/2017 | Chuaypradit et al. |
| 9,843,772 B2 | 12/2017 | Lee et al. |
| 10,242,476 B2 | 3/2019 | Bastaldo-Tsampalis et al. |
| 10,297,082 B2 | 5/2019 | Wilson et al. |
| 10,304,247 B2 | 5/2019 | King |
| 10,503,351 B2 | 12/2019 | Gullicksen |
| 10,733,800 B2 | 8/2020 | Booth et al. |
| 11,314,376 B2 | 4/2022 | Agarawala et al. |
| 11,830,148 B2 | 11/2023 | Booth et al. |
| 2002/0050988 A1 | 5/2002 | Petrov et al. |
| 2002/0158873 A1 | 10/2002 | Williamson |
| 2008/0015018 A1 | 1/2008 | Mullen |
| 2008/0089577 A1 | 4/2008 | Wang |
| 2009/0251465 A1 | 10/2009 | Hassenpflug |
| 2009/0279784 A1 | 11/2009 | Arcas et al. |
| 2010/0245376 A1 | 9/2010 | Bar-Zeev et al. |
| 2010/0315412 A1 | 12/2010 | Sinha et al. |
| 2011/0230263 A1 | 9/2011 | Ng |
| 2012/0001901 A1 | 1/2012 | Park |
| 2012/0069018 A1 | 3/2012 | Yamaya et al. |
| 2012/0142415 A1 | 6/2012 | Lindsay |
| 2012/0194516 A1 | 8/2012 | Newcombe et al. |
| 2012/0249741 A1 | 10/2012 | Maciocci et al. |
| 2012/0263154 A1 | 10/2012 | Blanchflower et al. |
| 2012/0264510 A1 | 10/2012 | Wigdor et al. |
| 2013/0018952 A1 | 1/2013 | McConnell et al. |
| 2013/0083062 A1 | 4/2013 | Geisner et al. |
| 2013/0141418 A1 | 6/2013 | Edholm |
| 2013/0141428 A1 | 6/2013 | Gipson |
| 2013/0196759 A1 | 8/2013 | Kim |
| 2013/0196772 A1 | 8/2013 | Latta et al. |
| 2013/0215230 A1 | 8/2013 | Miesnieks et al. |
| 2013/0225296 A1 | 8/2013 | Kim |
| 2013/0342564 A1 | 12/2013 | Kinnebrew et al. |
| 2014/0071251 A1 | 3/2014 | Nakamura et al. |
| 2014/0218361 A1 | 8/2014 | Abe et al. |
| 2015/0015576 A1 | 1/2015 | Algreatly |
| 2015/0016777 A1 | 1/2015 | Abovitz et al. |
| 2015/0029214 A1 | 1/2015 | Kumagai |
| 2015/0312561 A1 | 10/2015 | Hoof et al. |
| 2015/0348511 A1 | 12/2015 | Oriol et al. |
| 2016/0012157 A1 | 1/2016 | Williams et al. |
| 2016/0026253 A1 | 1/2016 | Bradski et al. |
| 2016/0027215 A1 | 1/2016 | Burns et al. |
| 2016/0093108 A1 | 3/2016 | Mao et al. |
| 2016/0212272 A1 | 7/2016 | Srinivasan et al. |
| 2016/0253844 A1* | 9/2016 | Petrovskaya .......... G06Q 50/01 345/633 |
| 2016/0300387 A1 | 10/2016 | Ziman |
| 2017/0287218 A1 | 10/2017 | Nuernberger et al. |
| 2017/0323482 A1 | 11/2017 | Coup et al. |
| 2018/0033208 A1 | 2/2018 | Martin |
| 2018/0095616 A1 | 4/2018 | Valdivia et al. |
| 2018/0096519 A1 | 4/2018 | Tokubo |
| 2018/0114353 A1 | 4/2018 | Champion et al. |
| 2018/0122043 A1 | 5/2018 | Energin et al. |
| 2018/0123813 A1 | 5/2018 | Milevski et al. |
| 2018/0144458 A1 | 5/2018 | Xu et al. |
| 2018/0144547 A1 | 5/2018 | Shakib et al. |
| 2018/0173404 A1 | 6/2018 | Smith |
| 2018/0174367 A1 | 6/2018 | Marom et al. |
| 2018/0225885 A1 | 8/2018 | Dishno |
| 2018/0247446 A1 | 8/2018 | Litvin |
| 2018/0307303 A1 | 10/2018 | Powderly et al. |
| 2019/0197599 A1 | 6/2019 | Zia et al. |
| 2019/0197768 A1 | 6/2019 | Taylor et al. |
| 2019/0311548 A1 | 10/2019 | Wang et al. |
| 2019/0313059 A1 | 10/2019 | Agarawala et al. |
| 2019/0362312 A1 | 11/2019 | Platt et al. |
| 2020/0027194 A1 | 1/2020 | Nourai et al. |
| 2020/0051336 A1 | 2/2020 | Ichikawa et al. |
| 2020/0051338 A1 | 2/2020 | Zia et al. |
| 2020/0066046 A1 | 2/2020 | Stahl et al. |
| 2020/0368616 A1 | 11/2020 | Delamont |
| 2021/0110560 A1 | 4/2021 | Knorr et al. |
| 2021/0134000 A1 | 5/2021 | Malisiewicz et al. |
| 2021/0233303 A1 | 7/2021 | Takahashi |
| 2024/0046590 A1 | 2/2024 | Booth et al. |

FOREIGN PATENT DOCUMENTS

| | | |
|---|---|---|
| CN | 106951882 B | 3/2021 |
| EP | 3945486 A1 | 2/2022 |

OTHER PUBLICATIONS

Irawati S., et al., "Spatial Ontology for Semantic Integration in 3D Multimodal Interaction Framework," VRCIA, Hong Kong, ACM, Jun. 14-17, 2006, p. 129-135.

Coster; "The Effects of Shadows on Depth Perception in Augmented Reality on a Mobile Device," Degree Project in Computer Science and Engineering, Royal Institute of Technology, School of Electrical Engineering and Computer Science (EECS), Apr. 24, 2019, 16 pages.

Popovic M., et al., "Grasping Unknown Objects Using an Early Cognitive Vision System for General Scene Understanding," IEEE-RSJ International Conference on Intelligent Robots and Systems, 2011, 8 Pages.

Office Action mailed Jun. 28, 2024 for Chinese Application No. 201910105998.4, filed Jan. 18, 2019, 6 pages.

* cited by examiner

METHOD OF GENERATING A VIRTUAL ENVIRONMENT BY SCANNING A REAL-WORLD ENVIRONMENT WITH A FIRST DEVICE AND DISPLAYING THE VIRTUAL ENVIRONMENT ON A SECOND DEVICE

TECHNICAL FIELD

This disclosure generally relates to artificial reality environments, including virtual reality environments and mixed virtual reality environments.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). Artificial reality can also take place in virtual environments, which are computer-generated environments which may include virtual reality artifacts such as virtual locations, virtual events, and the like. Certain virtual reality applications may allow different users to meet up to socialize and/or to collaborate on one or more tasks within the virtual reality applications. The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a hand-held device or computing system, or any other hardware platform capable of providing artificial reality content to one or more viewers.

SUMMARY OF PARTICULAR EMBODIMENTS

Particular embodiments described herein relate to a method of creating a virtual representation of a real-time environment through real-time rendering techniques. A host user may scan a real-world environment with a hand-held device to create a virtual environment based on the real-world environment. In particular embodiments, the hand-held device may be a phone, a tablet, or a mobile computing device. Additionally, the host user is in possession of a separate head-mounted device. In particular embodiments, the HMD may be an augmented reality (AR) or virtual reality (VR) headset. In particular embodiments, the HMD may comprise one or more sensors (e.g. a camera).

The host user may invite one or more guest users to join the virtual environment. The real-world environment may be, but is not limited to, a living room, a multi-bedroom house, or a conference room. Then, the host user and the guest users may interact together in the virtual environment. For example, the host user and the one or more guest users may talk to each other or see each other move around in the virtual environment. In particular, the host user may walk around in his or her physical environment, and the host user's avatar moves in a corresponding position in the virtual environment. A benefit of this real-time rendering method is that there is no prior calibration required to render the virtual environment. Rather, the host user can scan a physical environment in real-time and invite guest users to join the virtual environment, even as the environment is being rendered.

Particular embodiments described herein relate to synchronizing content and objects from real life with those in the digital/VR environment to enhance user interaction, communication, and cooperation with other users (e.g., for collaborating on projects). In particular embodiments, synchronizing content and objects from real life with those in the digital/VR environment includes localizing the headset by matching features in a real-world environment with features in the virtual space. In particular embodiments, the localizing the headset to the real-world environment is by comparing salient features in the real-world environment to the scanned features in the virtual environment.

This system may first scan the host user's real-life environment to create a virtual environment which is based on the real-world environment. Then, the host user may invite guest users to interact in the VR environment. In particular embodiments, the host of the session creates a scan of his/her real environment in real-time and the textured mesh automatically shows up in the host's HMD as well as in the HMDs of all invited users. The host user and one or more guest users may be associated with a virtual representation corresponding to each user. In particular but non-limiting embodiments, the host and guest users may be represented by an avatar, a 3D model of the user, or a mesh of the user.

In particular embodiments, the artificial reality system comprises a first device and a second device. In particular embodiments, the first device is a hand-held device (e.g., a mobile phone, a tablet, or other mobile computing device). In particular embodiments, the first device may be used to gather information about the layout and depth of the environment. In particular embodiments, a host user scans his or her physical environment with the first device to generate a three-dimensional model of the room and/or a textured mesh. This three-dimensional rendering is generated from the perspective of the first device and is transformed into a three-dimensional model. In particular embodiments, the second device may be used to generate the visualization for display. In particular embodiments, the second device may be an HMD comprising one or more of: a camera, visual display, a microphone, and computing system. In particular embodiments, the computing system may be a standalone host computer system, an on-board computer system integrated with a headset, a hand-held device, or any other hardware platform capable of providing artificial reality content to and receiving inputs from the user. In particular embodiments, the second device may be an HMD system, comprising both a headset and a tracking device which tracks a body pose. In particular embodiments, the body pose may be the position of the user's hands, arms, or wrists. As an example but not by way of limitation, the tracking device may be hand controllers, a wrist-mounted device, or an arm-mounted device.

In particular embodiments, the artificial reality system determines the host user's location based on input received from the HMD by localizing the image obtained from the camera on the HMD to the three-dimensional model. In particular embodiments, the data from the sensor of the first device is used to generate a three-dimensional model of the room. In particular embodiments, the three-dimensional model has a three-dimensional mesh and a texture. In particular embodiments, the three-dimensional model has salient features which were observed by the sensors of the first device. In particular, salient features may be objects or other features of the room which have high contrast, a particular color, or a particular shape which makes a particular object or part of the object stand out from the rest of the room. In particular embodiments, the salient features in the three-dimensional model are compared to features captured by the cameras on the HMD.

In particular embodiments, the three-dimensional model of the real-world environment is generated on the first device (e.g. a hand-held device), and the first device transmits the three-dimensional model to the headset. In particular embodiments, the first device sends data captured from sensors of the first device to the HMD, and the HMD uses the received data to generate the three-dimensional model. In particular embodiments, the HMD transmits the three-dimensional model to a remote device.

In particular embodiments, a user wearing an HMD has a particular head pose. In particular embodiments, the head pose refers to the position of the user's head and HMD relative to the environment. For example, as a user moves or looks around a room, the user's head pose will change. In particular embodiments, the head pose is determined by localizing the head-mounted device within the three-dimensional model based on images captured by a second camera of the head-mounted device. In particular embodiments, the image displayed on the HMD corresponds to the scanned real-world environment generated based on the three-dimensional model as viewed from the pose. In particular embodiments, the user's second device also comprises hand controllers which transmit the user's body pose information to a server. In particular embodiments, the controller may be joysticks associated with the HMD. In particular embodiments, location information of the guest user(s) is determined by receiving data from the guest user(s) controllers. In particular embodiments, location information of the guest user is transmitted to the host user, and the transmitted information allows the host user to view the avatar(s) associated with the guest user(s). In particular embodiments, the host user and guest user(s) each have at least one device with a microphone to allow the users talk to each other via Voice over Internet Protocol (VoIP).

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in particular embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a hand-held device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, in order to generate a virtual space, a host user scans his or her real-world environment with a first device. As an example, the first device may be a hand-held device such as a mobile phone comprising a camera and a depth sensor. In particular embodiments, a host user scans the real-world environment with the first device to generate a three-dimensional model of the room. In particular embodiments, the three-dimensional model has a three-dimensional mesh and a texture which are generated from sensor data from the first device (e.g. a mobile device).

Furthermore, this three-dimensional rendering is generated from the perspective of the first device. Next, the virtual reality system renders the room of the HMD. In particular embodiments, the HMD device has its own three-dimensional model, and the virtual reality system localizes the three-dimensional model of the first device with the second device.

Figure 1:
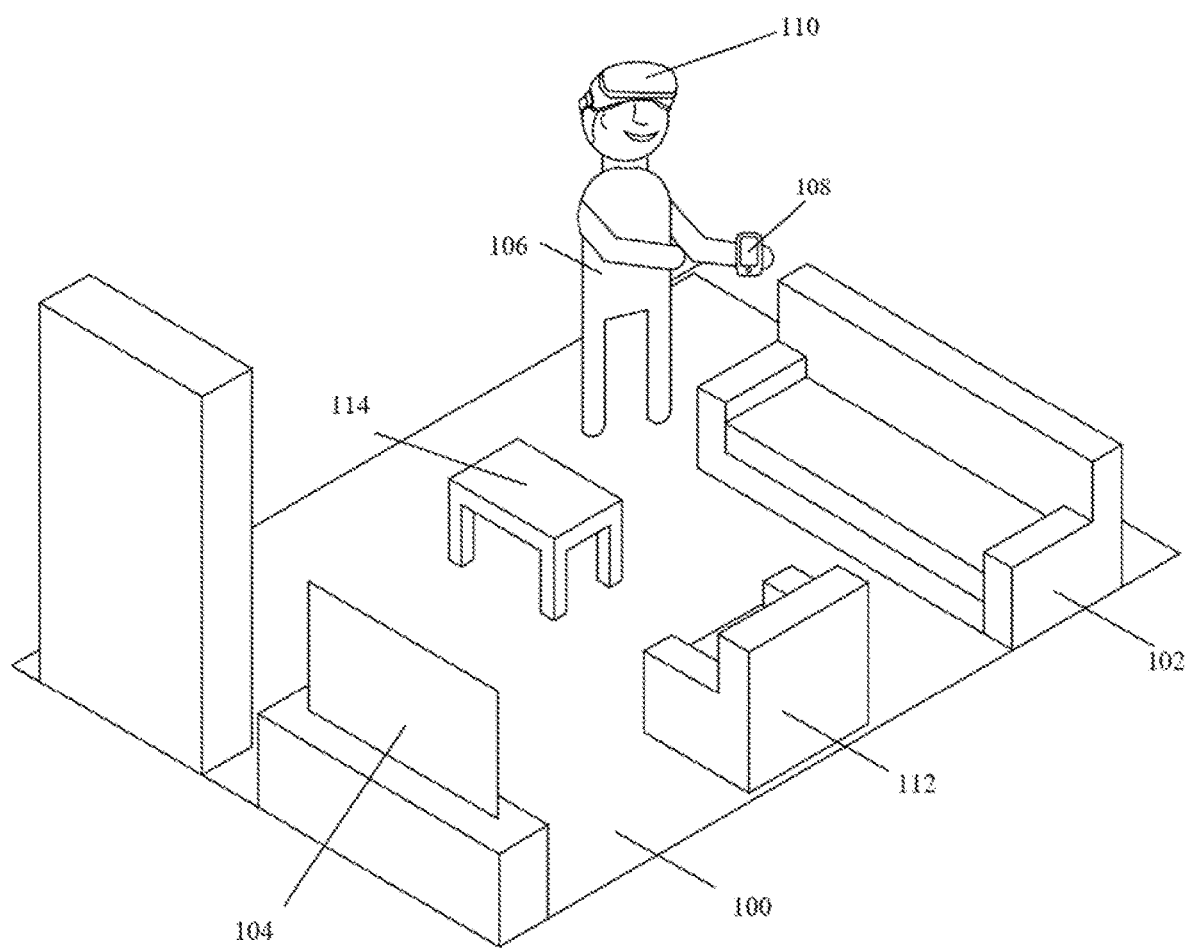
FIG. 1 illustrates an example host user standing in the real-world environment in accordance with the present embodiments.

FIG. 1 illustrates an example real-world environment. As an example and not by way of limitation, the real-world environment may be a living room 100. As shown in FIG. 1, the real-world environment includes sofas 102 and 112, coffee table 114, and television 104. In particular embodiments, the real-world environment may include a host user 106 with a first device 108 and second device 110. In particular embodiments, the first device 108 may be a mobile phone and the second device 110 may be a HMD. In particular embodiments, the artificial reality system that provides the artificial reality content may be implemented on various platforms, including a HMD connected to a host computer system, a standalone HMD, a hand-held device or computing system, or any other hardware platform capable of providing artificial reality content to one or more viewers.

In particular embodiments, the host user may create a virtual environment to host and interact with guests. Particular embodiments described herein are directed to creating a virtual environment which is a representation of a real-world environment, such as a living room. In particular embodiments, in order to generate the virtual space, the host user 106 will scan the living room 100 with a first device 108. In particular embodiments, the first device 108 is a hand-held mobile device comprising a camera and a depth sensor. In particular embodiments, the host user points the first device 108 in all directions of the real-world environment and may add more detail over time. In particular embodiments, the host user 106 may walk around the physical environment, such as living room 100, to scan the entire room. In particular embodiments, the first device 108 comprises a camera which captures images of the room and a depth sensor which measures the depth of the room and objects in the room. In particular embodiments, the first device 108 contains a Lidar sensor which may measure the distance and depth range of objects in the room. In particular embodiments, the first device 108 may capture one or more of these features: physical dimensions of the environment, physical dimensions of objects in the environment, colors and shapes of objects in the environment, textures of the room and objects in the environment, geometries of objects in the environment or other parts of interest. In particular embodiments, the three-dimensional model of the real-world environment is generated on the first device (e.g. a hand-held device), and the first device transmits the three-dimensional model to the HMD. In particular embodiments, the first device analyzes data gathered by the first device to identify objects or features in the room. For example, the first device may analyze the scanned data to identify furniture, walls, pictures/artwork, windows, or doors. In particular embodiments, the first device sends data captured from sensors of the first device to the HMD, and the HMD uses the received data to generate the three-dimensional model. In particular embodiments, the HMD transmits the three-dimensional model to a remote device. In particular embodiments, the first device sends data of the scanned room to the second device in real-time. In particular embodiments, the second device generated the three-dimensional model from the sensor data received from the first device.

In particular embodiments, a user interface on the first device or the second device will inform the host user 106 of missed areas in the room 100 which may need to be scanned. In other embodiments, the user interface of the first device or second device may inform the host user 106 of areas which may need to be scanned due to complexities in the area.

In particular embodiments, the data from the sensor of the first device 108 is used to generate a three-dimensional model of the room. In particular embodiments, the three-dimensional model has a three-dimensional mesh and a texture. In particular embodiments, the three-dimensional has salient features which were observed by the sensors of the first device. In particular embodiments, the sensors of the first device include a camera which captures images in the room, and one or more depth sensors which capture the depth of objects in the room. In particular, salient features may be objects or other features of the room which have high contrast, a particular color, or a particular shape which a particular object or part of the object stand out from the rest of the room. In particular embodiments, the salient features in the three-dimensional model are compared to features captured by the cameras on the HMD. In particular embodiments, the three-dimensional model is generated relative to the camera on the first device.

In particular embodiments, the HMD has its own three-dimensional model, generated relative to a camera on the HMD. In particular embodiments, the artificial reality system localizes the three-dimensional model generated from the first device with a three-dimensional model on the second device.

In particular embodiments, the artificial reality system will visualize the scanned room into an image which the host user may view on the first device 108 or the second device 110. In particular embodiments, a three-dimensional model is generated based on the sensor data captured from the first device. In particular embodiments, the three-dimensional model is generated on the first device.

In particular embodiments, the camera on the first device 208 captures higher resolution areas of the real-world environment based on certain characteristics, such as areas with high contrast or areas with prominent features. In particular embodiments, the second device may use prominent features to orient itself relative to the room.

In particular embodiments, the first device may provide multiple visualizations of the room, each visualization having a different level of quality or resolution. As an example and not by way of limitation, the artificial reality system may allow the host user to select the quality of the render that he or she wishes to share with his virtual guest. As an example and not by way of limitation, the host user may choose to share a higher quality rendering of his living room with a close friend, and a lower quality rendering of his living room for other guests. In particular embodiments, the first device may transmit sensor data to a server which processes the information to generate a higher quality and/or a lower quality rendering. In particular embodiments, one or more renderings from generated by the server is sent to one or more guest users.

In particular embodiments, the artificial reality system may render particular areas of the room in a higher resolution. As an example and not by way of limitation, the host user may select particular areas to be rendered at a higher resolution. For instance, after the host user completes an initial scan, he may re-scan areas that he or she wishes to render at a higher resolution. In particular embodiments, the artificial reality system recognizes that by re-scanning an area, the host user wishes to render the re-scanned area in a higher resolution. In other embodiments, the host user may select particular areas to render at a lower resolution. For example, the host user may wish to render private items, such as family portraits hanging on walls, at a lower resolution. In another embodiment, the artificial system may use a deep learning approach to determine the particular resolution at which to render an object or a portion of the real-world environment. As an example and not by way of limitation, a deep learning algorithm may recognize certain areas or objects, such as a child's bedroom or a family portrait on a wall, to be private, and render those at a lower resolution. In particular embodiments, sensors on the first or second device may detect that an object has been moved in the real-world environment after a first scan of the real-world environment by comparing live sensor data to prior sensor data form the first scan, and prompt the host user to re-scan a portion of the real-world environment.

Figure 2A:
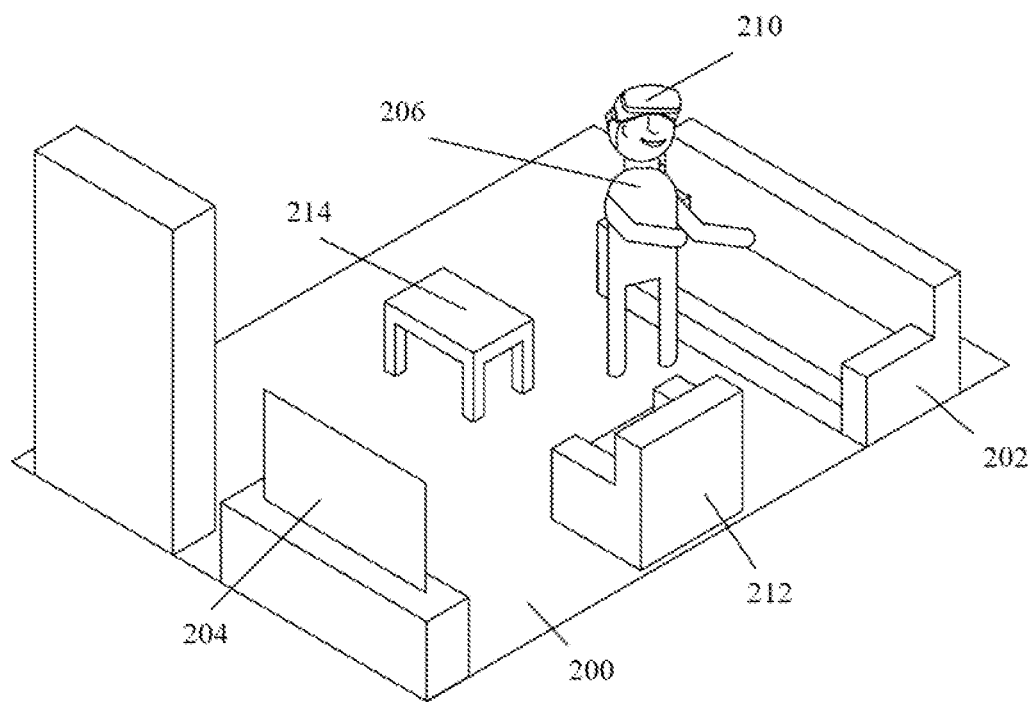
FIGS. 2A and 2B illustrate an example first avatar corresponding to the host user standing in the virtual space.
Figure 2B:
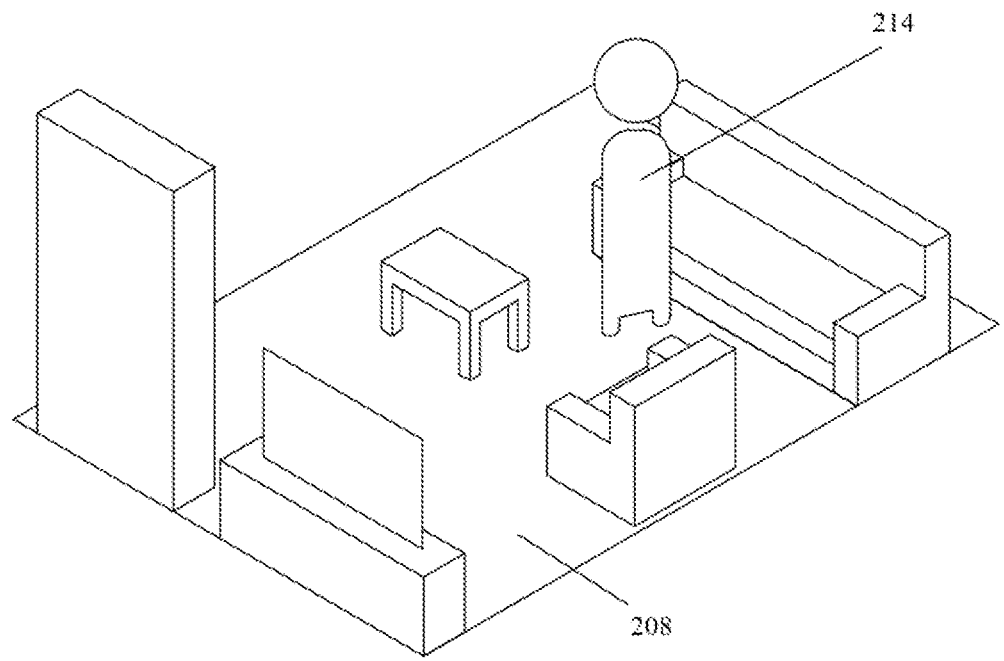

FIGS. 2A and 2B illustrate an example first avatar corresponding to the host user. For example, FIG. 2A illustrates a real-world scene in which the host user 206 is standing at a location in living room 200 comprising a sofa 202 and. FIG. 2B illustrates an example of a virtual environment corresponding to a real-world environment. In particular, virtual environment 208, shown as virtual living room, is generated from the host user 206 scanning his or her real-world living room 200. In particular, FIG. 2B illustrates a first avatar 214 corresponding to the host user 206. The first avatar 214 is standing at approximately the same position in the virtual living room 208 as the host user 206 is standing in the real-world living room 200.

In particular embodiments, after the artificial reality system renders the virtual environment based on a real-world environment, the host user may save the virtual environment for future use. For example, the host user may wish to host a meeting in his living room even though the host user is not physically present. In another embodiment, the virtual environment may be saved in the artificial reality system to assist in future renderings of the same room. For example, if a host user holds a second meeting in his living room and scans his living room for a second time, the artificial reality system may use the first rendering as a baseline, and implement changes which are captured during the scanning in the second meeting to save processing power.

Figure 3A:
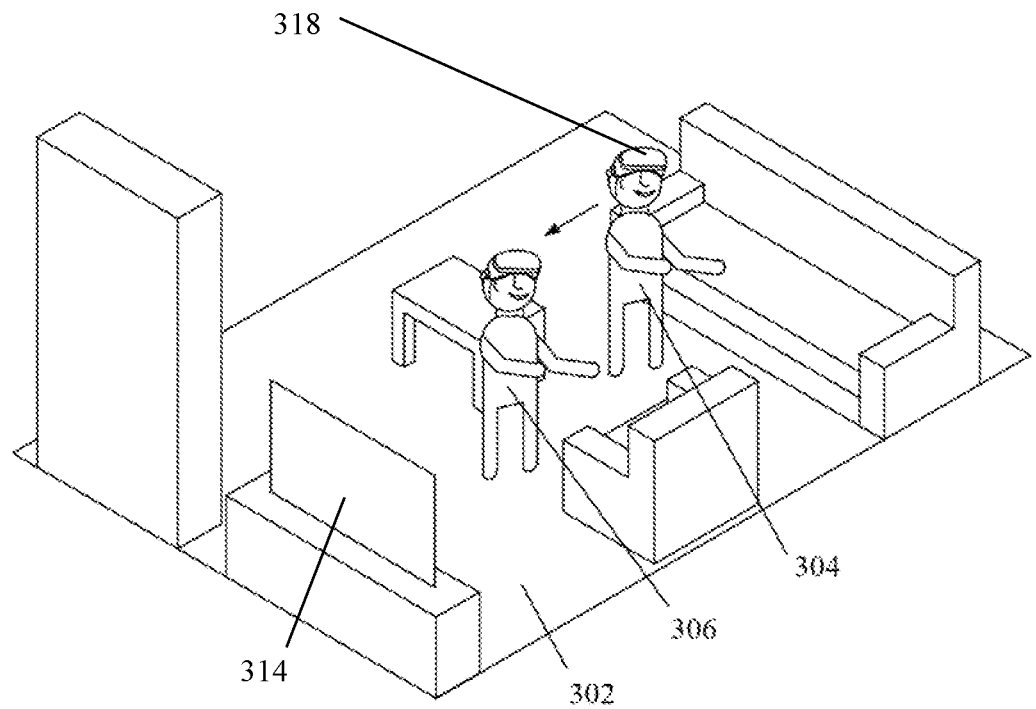
FIGS. 3A and 3B illustrate an example first avatar moving in coordination with the host user.
Figure 3B:
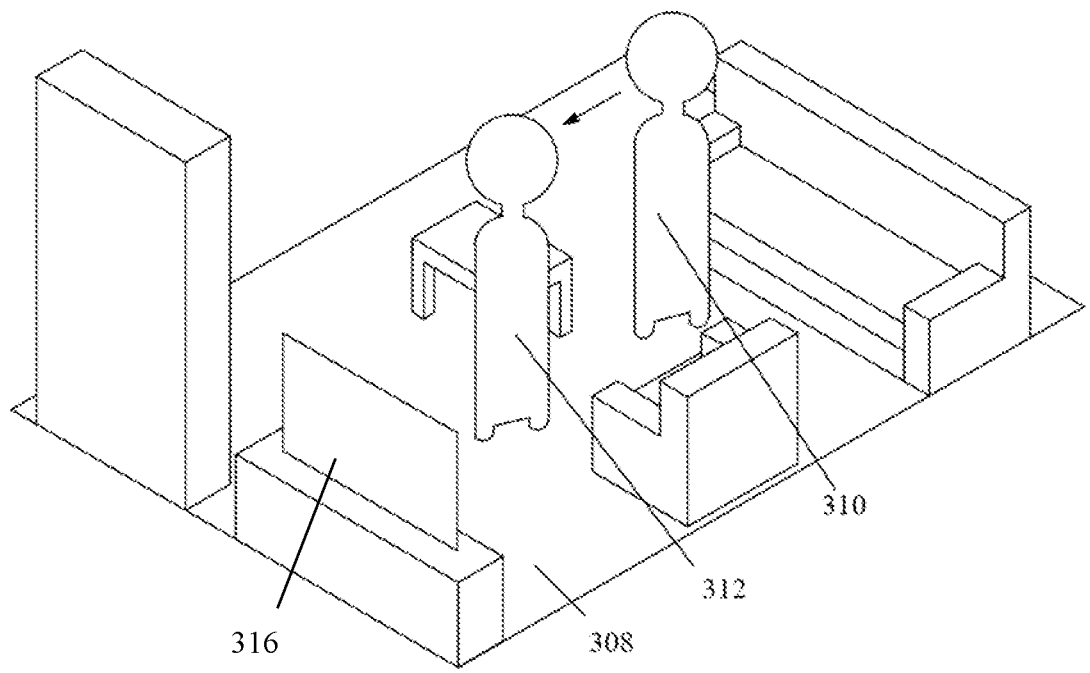

FIG. 3A and FIG. 3B illustrate an example first avatar moving in coordination with the host user. For example, in FIG. 3A, which depicts real-world environment 302, the host user 304 moves towards the television 314, to a position indicated by 306. FIG. 3B, which depicts virtual environment 308, shows the avatar corresponding to the host user moving in conjunction with the host user. For example, as the host user moves from a position at 304 to a position at 306 in the real-world environment, the avatar corresponding to the host user moves from a position at 310 to a position at 312 in the virtual environment. In other words, as the host user 304 in the real-world environment moves towards the television 314, the avatar 310 corresponding to the host user also moves towards virtual television 316 in the virtual environment. The location of the host user at 306 corresponds to the location of the avatar at 312. The artificial reality system tracks the movements of the host user by using the camera on the HMD 318 worn by the host user to track the user in the three-dimensional model generated by the first device and aligned on the second device to a three-dimensional model generated from the perspective of the HMD. In particular embodiments, the host user 304 has a particular head pose which corresponds to the direction that the host user's head is facing.

Additionally, the host user may wear a tracking device which tracks one or more of: the host user's hands, arms, or fingers. As an example and not by way of limitation, the tracking device may be hand controllers, a wrist-mounted device, or an arm-mounted device. In particular embodiments, the artificial reality system tracks the movements of the host user's tracking device and synchronizes the tracking device positions with the body pose positions of the host user's virtual representation (e.g., an avatar). In particular embodiments, the host user's body pose is tracked via a sensor (e.g., a camera) on the host user's HMD. In particular embodiments, information about the host user's location is regularly transmitted to the server, which may transmit the information to the artificial reality applications located on guest devices.

Figure 4:
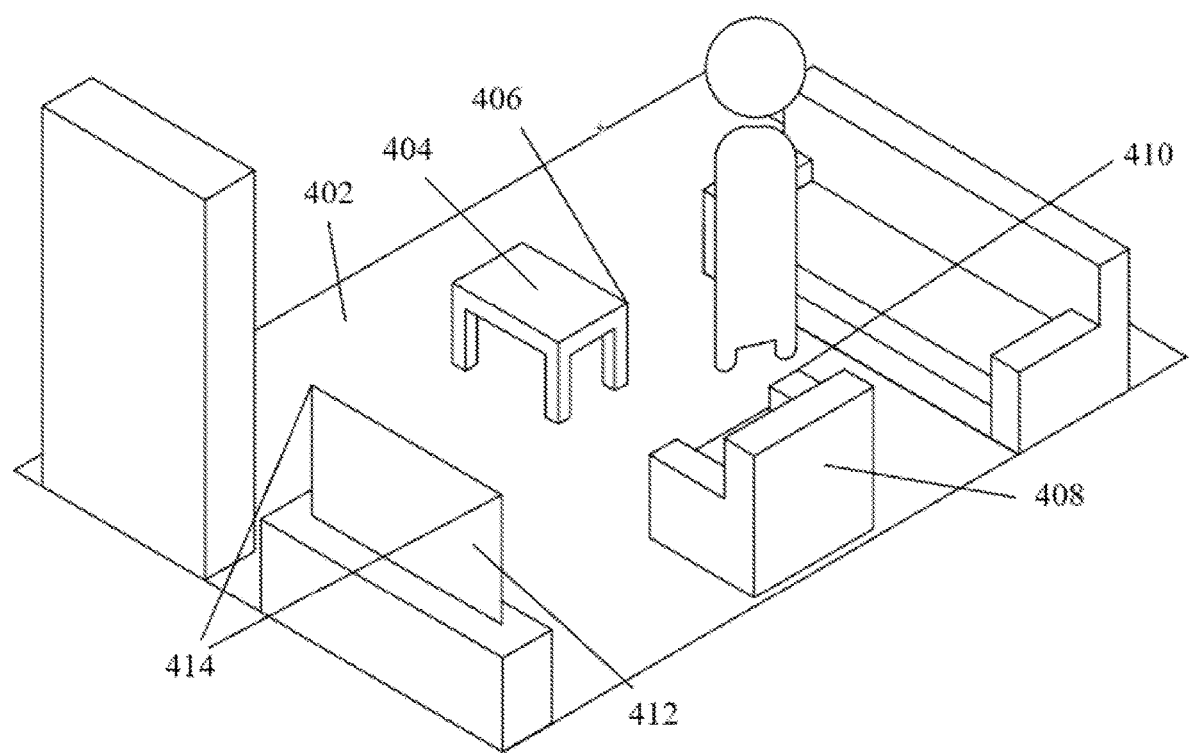
FIG. 4 illustrates an example virtual environment.

FIG. 4 illustrates an example virtual environment generated from scanning a real-world environment with a first device. In particular embodiments, the artificial reality system identifies points of interest in the real-world environment using the first device. In particular embodiments, these points of interest are located on objects in the real-world environment, such as coffee table 404, sofa 408, or television 412, the aforementioned being virtually rendered in virtual environment 402. In particular embodiments, a points of interest are on one or more of: a wall, a floor, a light fixture, or other fixture in the virtual environment. In particular embodiments, one or more objects in the virtual environment 402 has one or more salient features. In particular embodiments, the salient features may be located on edges, corners, or surfaces of objects. In particular embodiments, salient features are referred to as featurepoints. In particular embodiments, featurepoints may be determined based on features of objects which may include one or more of: size, shape, color, or contrast. In the example virtual environment 402, some featurepoints are identified as 406, 410, and 414. For example, featurepoint 406 is located at a corner of coffee table 404. For example, feature 410 is located at a corner of sofa 408. For example, featurepoints 414 are located at the corners of television 412. In particular embodiments, featurepoints are located at the edge of an object. In particular embodiments, featurepoints are located on a surface of the object.

In particular embodiments, featurepoints are observed or picked up by sensors on the first device. In particular embodiments, featurepoints are included in the three-dimensional model of the real-world environment. In particular embodiments, featurepoints are determined on the first device. In other embodiments, data from sensors on the first device is transmitted to the second device, and featurepoints are determined on the second device.

In particular embodiments, the second device associated with the first user comprises one or more sensors which capture images of the real-world environment. In particular embodiments, the second device comprises one or more cameras. In particular embodiments, the one or more cameras on the second device captures images from the room which include objects in the room containing one or more featurepoints. In particular embodiments, the second device compares one or more salient features of one or more objections in the real-world environment captured by a sensor on the second device, to the three-dimensional model containing one or more featurepoints. For example, after the one or more featurepoints 406, 410, or 414 are determined in the three-dimensional model, the second device will compare images captured from a camera on the second device to identify salient features in order to localize the headset. In particular embodiments, this method is used to place the host user's avatar in the virtual environment in a location corresponding to where the host user is standing in the real-world environment. For example, if the host user is standing next to a first sofa in the real-world, the host user's avatar will appear next to a first sofa in the virtual world, wherein the first sofa in the virtual environment is at the same relative location as the first sofa in the real-world environment. In particular embodiments, this method of localizing the HMD within the three-dimensional model is also used to determine the pose of the HMD. In particular embodiments, the virtual environment corresponding to the scanned real-world environment is displayed on a display of the HMD based on the three-dimensional model as viewed from a pose. For example, if the host user is facing television 412 in a real-world environment, the host user's avatar will face a television in the virtual environment.

In particular embodiments, the host user's head pose is transmitted to a remote device associated with a guest user. In particular embodiments, the host user's head pose is transmitted to a plurality of remote devices, each remote device being associated with a particular guest user. In particular embodiments, a host user wearing an HMD may freely move around the real-world environment without bumping into objects in the real-world environment. In particular embodiments, the process of aligning the three-dimensional model occurs as the host user wearing the HMD is scanning the room.

Figure 5:
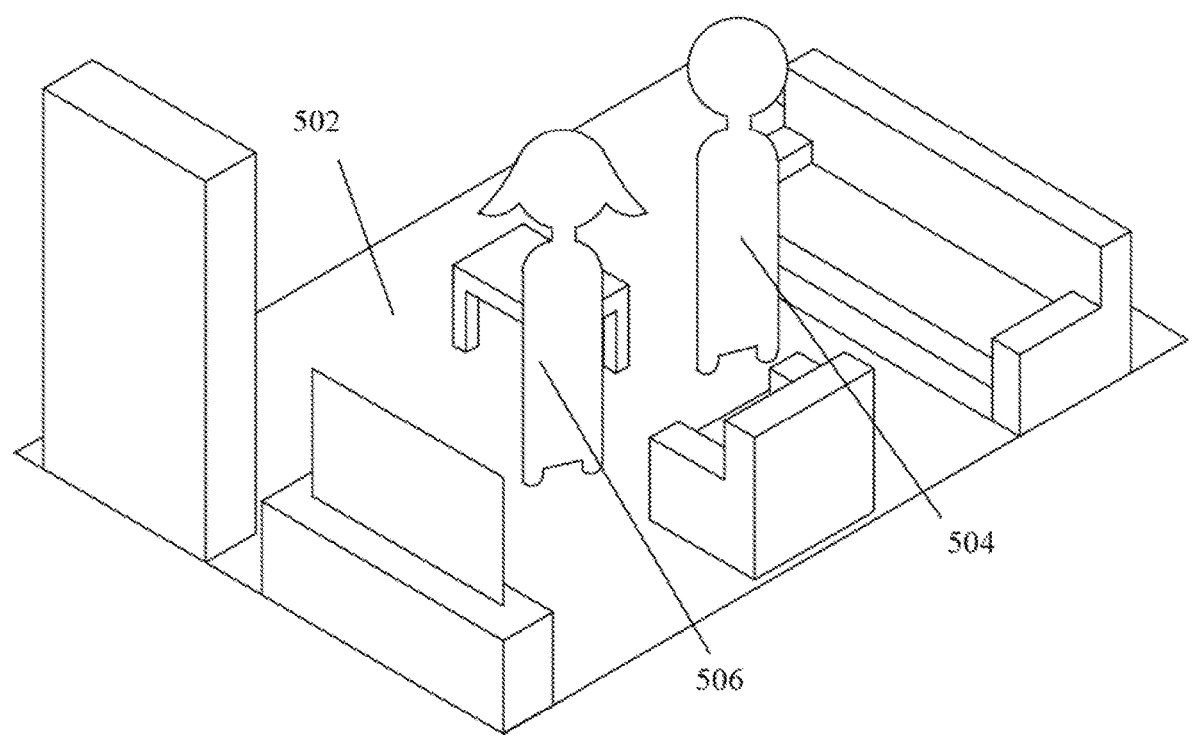
FIG. 5 illustrates an example first avatar corresponding to a host user and a second avatar corresponding to a guest user, both standing in the virtual space.

FIG. 5 illustrates an example first avatar corresponding to a host user, and a second avatar corresponding to a second user, standing in the virtual space. In particular embodiments, a host user may want to create a virtual space to invite one or more guest users so that the host user and guest users may interact with each other. In particular embodiments, the one or more guest users have their own HMD. The guest users may be located anywhere in the world. In particular embodiments, the one or more guest users each have a remote device. In particular embodiments, the remote device is an HMD, a computer, a tablet, or a mobile device. In particular embodiments, guest users have an HMD and associated computing system which may receive an input via a controller. In particular embodiments, an avatar associated with the guest user appears in the virtual space. For example, FIG. 5 illustrates an example virtual space 502, a host user avatar 504, and a guest user avatar 506. Avatars 504 and 506 are example representations of a virtual representation of a user. In particular embodiments, the virtual representation of each user may also comprise body pose information. In particular embodiments, the virtual representation may be a mesh of each user. In particular embodiments, the virtual representation of each user comprises head pose information. In particular embodiments, the virtual representation of each user comprises information about the user's body pose. In particular embodiments, the body pose comprises one or more of: finger, hand, or arm positions relative to the user's body. In particular embodiments, the guest user may control his or her guest avatar in the virtual space 502 using his or her controllers. In particular embodiments, the guest user may join the virtual environment on his or her mobile phone and use the mobile phone to change the position of his or her view. In particular embodiments, the guest user may control the location of the avatar associated with the particular guest user by using a controller associated with the guest user's HMD. In particular embodiments, the controller may be joysticks associated with the HMD. In particular embodiments, location information of the guest user(s) is determined by receiving data from the guest user(s) controllers. In particular embodiments, location information of the guest user is transmitted to the host user, and the transmitted information allows the host user to view the avatar(s) associated with the guest user(s).

In particular embodiments, each remote device associated with each guest user receives head pose information and location information from the host user and one or more other guest users in the virtual environment. In particular embodiments, location information comprises information on where the location of the user's avatar or other virtual representation in the virtual environment. In particular embodiments, the guest user(s) receives the three-dimensional model of the real-world environment.

In particular embodiments, each remote device associated with each guest user receives body pose information from the host user and optionally, one or more guest users. In particular embodiments, the body pose comprises information on one or more of: finger, hand, or arm positions. In particular embodiments, host users and guest users may be associated with a tracking device which tracks the body pose of the particular user. In particular embodiments, the tracking device may comprise hand controllers equipped with joysticks. In particular embodiments, the tracking device may comprise a device worn on a particular user's wrist which receives biological signals from the particular user. In particular embodiments, the biological signals may comprise nerve signals which are obtained through electromyography. In particular embodiments, the tracking device is a headset comprising a camera which visually tracks the body pose of the user. In particular embodiments, the tracking device is embedded into the user's remote device and the user does not wear a separate, additional tracking device. In particular embodiments, the body pose of each user is transmitted to a server which transmits the information to devices associated with other users in the virtual environment. In particular embodiments, the tracking device continuously tracks the user's body pose in real-life and sends the body pose information to a server. In particular embodiments, the virtual representation comprises virtual fingers, hands, or arms which are continuously updated using the body pose information received from the particular user's tracking device. In particular embodiments, the updated virtual representation of the particular user is continuously sent to devices associated with other users in the virtual environment.

In particular embodiments, each remote device associated with each guest user determines the location and head-pose of the guest user in the three-dimensional model and transmits the pose and location information of the particular guest user to the second device associated with the host user. In particular embodiments, the second device associated with the host user receives one or more of: location information of each guest user, head-pose information of each guest user, and body pose information of each guest user. Using the received information, the second device determines the location, body pose, and head pose positions of the virtual representations of the guest users in the virtual environment.

In particular embodiments, users have a microphone associated with each user. In particular embodiments, users may verbally communicate with each other over Voice over Internet Protocol (VoIP).

In particular embodiments, a host user sends a link to a guest user wherein the link contains an invitation to the virtual environment. The guest user may select the link and accept the invitation to the virtual environment. In particular embodiments, the guest user may join the virtual environment prior to it being fully rendered. In particular embodiments, the guest user may watch the virtual environment being rendered as the host user is scanning the room with the first device associated with the host user. In particular embodiments, the first device associated with the host user continuously updates the three-dimensional model as the room is being scanned by the host user and transmits the latest three-dimensional model to guest user(s), even if the three-dimensional model is incomplete. In particular embodiments, the guest user(s) watching the virtual environment materialize gradually.

In particular embodiments, one or more guest users receives the three-dimensional model generated for the virtual environment. In particular embodiments, a guest user may join the virtual environment from a designated spot. The designated spot may be, but is not limited to, adjacent to a door, at a table, or at a place designated by the user. In particular embodiments, the one or more guest users may join the virtual environment and spawn adjacent to and outside of a particular room, and be presented with a virtual doorbell which the guest user may select. In particular embodiments, on the guest user's selection of the doorbell, the host visitor receives an alert and is given an prompt on a user interface to let the guests into the virtual environment.

In particular embodiments, a virtual reality system associated with the guest user will render the display on the HMD associated with the guest user based on the guest user's perspective. In particular embodiments, the HMD associated with the guest user has its own three-dimensional model which is aligned with the three-dimensional model of the virtual environment. In particular embodiments, the guest user sees on his or her HMD the host user's avatar standing at a position corresponding to the host user's position in the real-world environment. In particular embodiments, the location of the guest user's avatar is regularly transmitted to a server, which transmits the information to the artificial reality application associated with the first user. In particular embodiments, the location of the host user's avatar is regularly transmitted to a server, which transmits the information to the artificial reality application associated with each of the one or more guest users.

Figure 6:
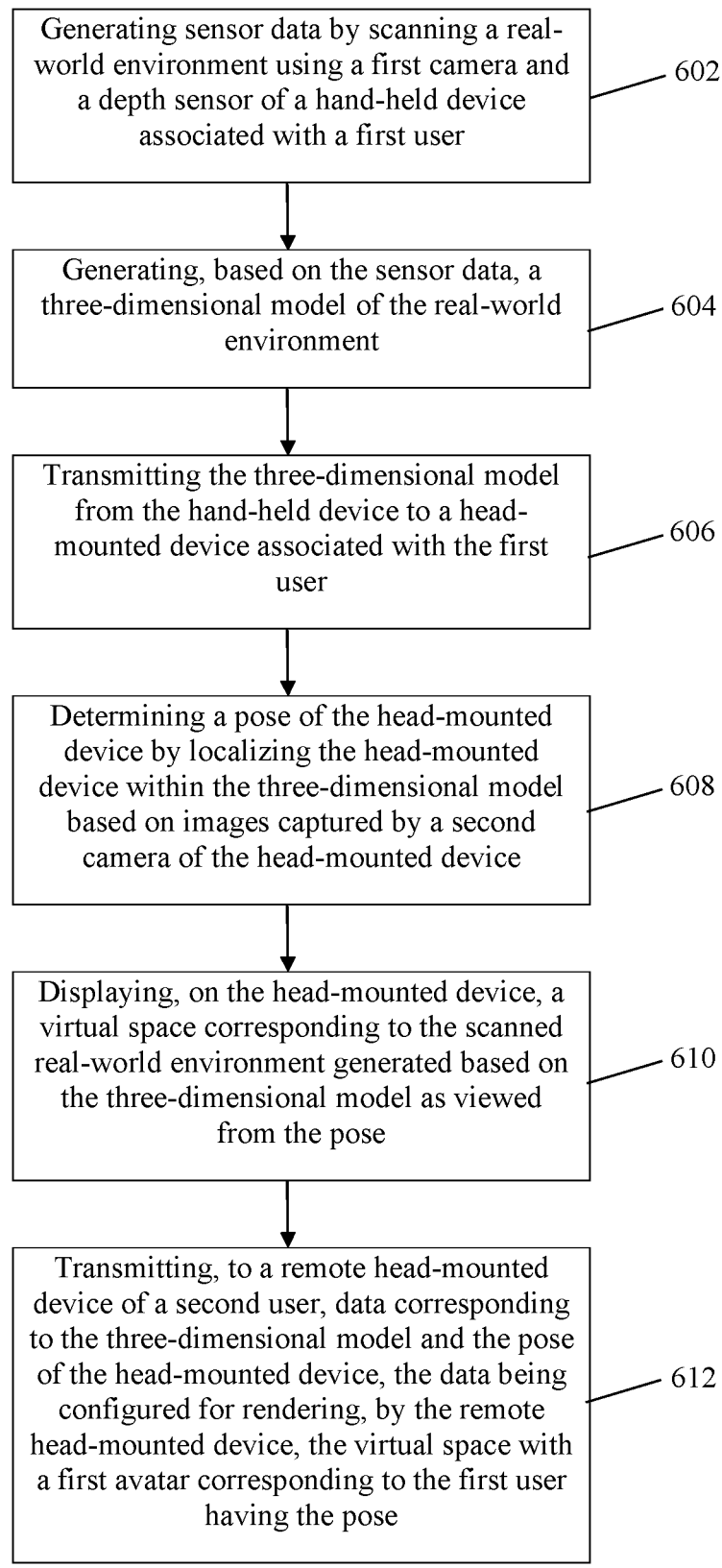
FIG. 6 illustrates an example method for scanning a real-world environment with a first device, rendering a virtual environment, and inviting a guest user to join the virtual environment.

FIG. 6 illustrates an example method for generating sensor data by scanning a real-world environment using a first camera and a depth sensor of a hand-held device associated with a first user (step 602), generating, based on the sensor data, a three-dimensional model of the real-world environment (step 604), transmitting the three-dimensional model from the hand-held device to a head-mounted device associated with the first user (step 606), determining a pose of the head-mounted device by localizing the head-mounted device within the three-dimensional model based on images captured by a second camera of the head-mounted device (step 608), displaying, on the head-mounted device, a virtual space corresponding to the scanned real-world environment generated based on the three-dimensional model as viewed from the pose (step 610), and transmitting, to a remote head-mounted device of a second user, data corresponding to the three-dimensional model and the pose of the head-mounted device, the data being configured for rendering, by the remote head-mounted device, the virtual space with a first avatar corresponding to the first user having the pose (step 612).

Figure 7:
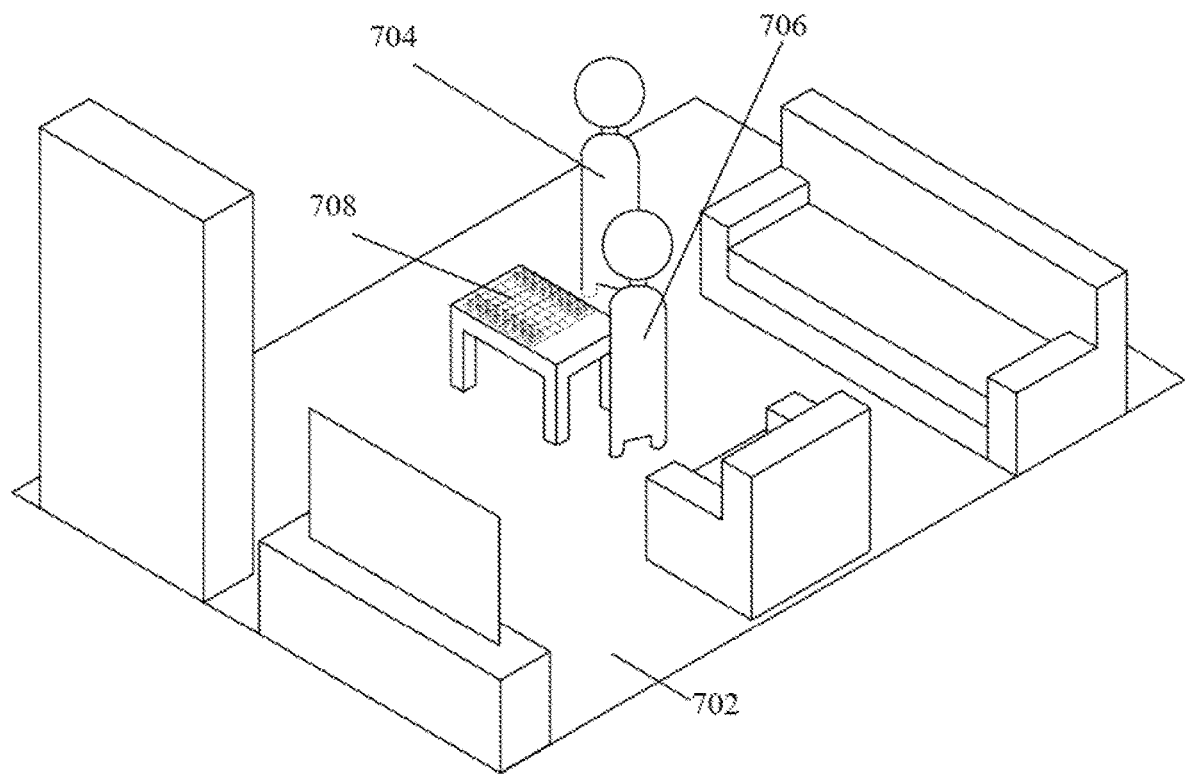
FIG. 7 illustrates an example of a host user and guest user interacting with virtual content in the virtual space.

FIG. 7 illustrates an example of a host user avatar 704 and guest user avatar 706 interacting with virtual content in the virtual space 702. In particular embodiments, virtual content, such as a chess board 708, is synchronized by a server. The server transmits information of the chess board in the virtual environment to the artificial reality applications associated with each of the host and guest users. The virtual content is rendered in the virtual environment from the perspective of each user. As an example and not by way of limitation, the server transmits information that the virtual chess board is anchored to a virtual table to each of the artificial reality applications associated with the host and guest users.

In particular embodiments, the host user may scan an object (e.g., a chessboard) in the real-world environment and a guest user may view the scanned objects (e.g., a chessboard or chess pieces) as a virtual objects on the guest user's device. In particular embodiments, the host user may interact with the real-world object(s) and transmit the interactions to the guest user. For example, a host user may move a first chess piece from a first location to a second location, and the guest user will see the corresponding virtual chess piece move from a first virtual location to a second virtual location. In particular embodiments, the host user's second device (e.g., an HMD) performs additional scans at a predetermined interval to update renderings of the real-world environment as the host user interacts with the object(s). In particular embodiments, the guest user may interact with virtual chess pieces associated with the guest user. In particular embodiments, the host user may interact with the virtual chess pieces.

As an example and not by way of limitation, virtual content may also include architectural designs, construction materials, or room layouts. Host users and guest users may interact with the virtual content by moving the virtual content, deleting the virtual content, adding new virtual content, or modifying the existing content.

In particular embodiments, the host user and/or the guest user may place the first device at a location in the real-world environment to allow the first device to continue scanning the environment after the virtual environment is rendered. In particular embodiments, the first device may be used to capture body pose information of the user. In particular embodiments, the captured body pose information is sent to a server, which transmits the information to artificial reality applications connected to the server. In particular embodiments, each users' avatars correspond to the real-life body movements of each respective users. In particular embodiments, the first device may be a smart display device comprising a camera, a videophone, or other smart-home device comprising a camera or other sensor.

System Overview

Figure 8:
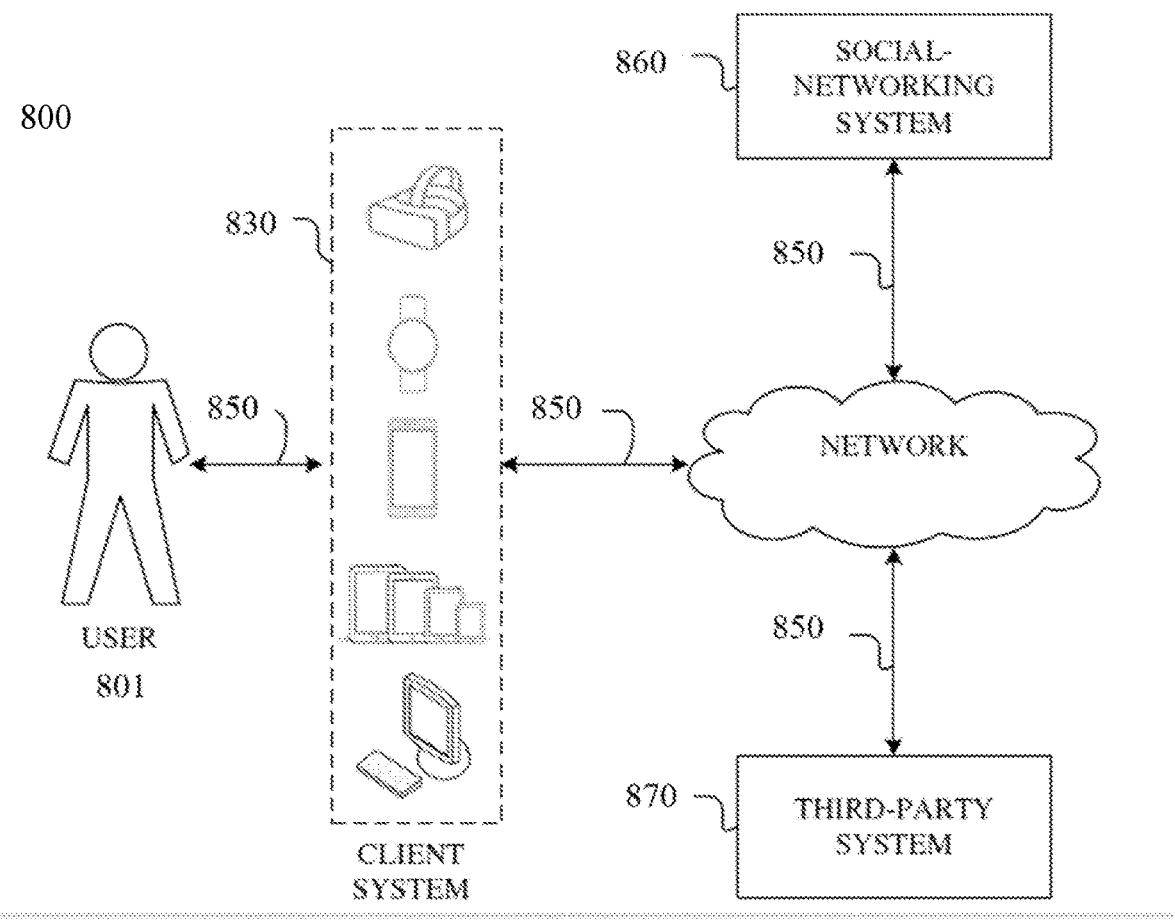
FIG. 8 illustrates an example network environment associated with a social-networking system.
Figure 9A:
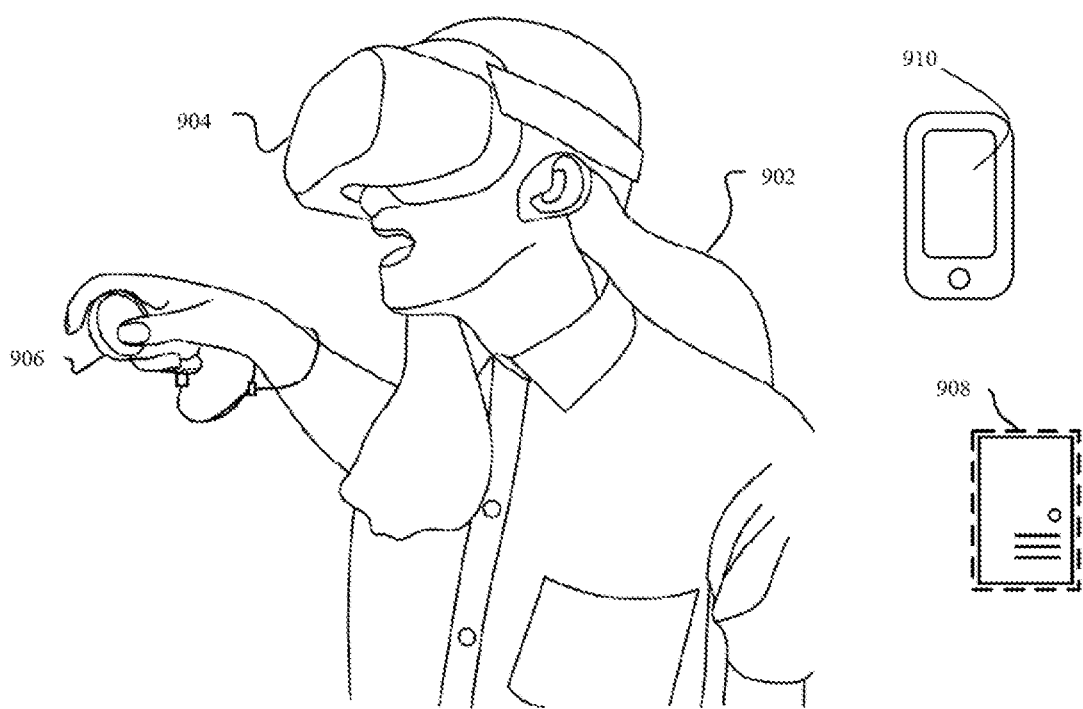
FIGS. 9A and 9B illustrate an example artificial reality system.
Figure 9B:
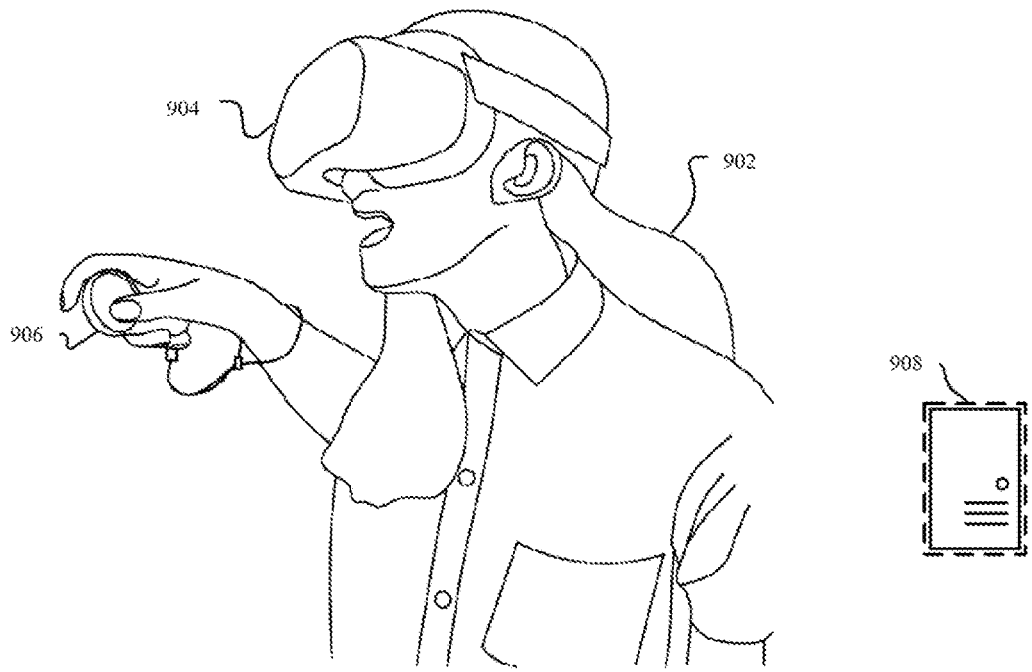

FIG. 8 illustrates an example network environment 800 associated with a social-networking system. Network environment 800 includes a user 801, a client system 830, a social-networking system 860, and a third-party system 870 connected to each other by a network 810. Although FIGS. 9A and 9B illustrates a particular arrangement of user 801, client system 830, social-networking system 860, third-party system 870, and network 810, this disclosure contemplates any suitable arrangement of user 801, client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of users 801, client systems 830, social-networking systems 860, third-party systems 870, and networks 810, this disclosure contemplates any suitable number of users 801, client systems 830, social-networking systems 860, third-party systems 870, and networks 810. As an example and not by way of limitation, network environment 801 may include multiple users 801, client system 830, social-networking systems 860, third-party systems 870, and networks 810.

In particular embodiments, user 801 may be an individual (human user), an entity (e.g., an enterprise, business, or third-party application), or a group (e.g., of individuals or entities) that interacts or communicates with or over social-networking system 860. In particular embodiments, social-networking system 860 may be a network-addressable computing system hosting an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 801 either directly or via network 810. In particular embodiments, social-networking system 860 may include an authorization server (or other suitable component(s)) that allows users 801 to opt in to or opt out of having their actions logged by social-networking system 860 or shared with other systems (e.g., third-party systems 870), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system through blocking, data hashing, anonymization, or other suitable techniques as appropriate. In particular embodiments, third-party system 870 may be a network-addressable computing system. Third-party system 870 may be accessed by the other components of network environment 801 either directly or via network 810. In particular embodiments, one or more users 801 may use one or more client systems 830 to access, send data to, and receive data from social-networking system 860 or third-party system 870. Client system 830 may access social-networking system 860 or third-party system 870 directly, via network 810, or via a third-party system. As an example and not by way of limitation, client system 830 may access third-party system 870 via social-networking system 860. Client system 830 may be any suitable computing device, such as, for example, a personal computer, a laptop computer, a cellular telephone, a smartphone, a tablet computer, or an augmented/virtual reality device.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 801. One or more first links 850 may differ in one or more respects from one or more second links 850.

Artificial Reality Overview

FIGS. 9A and 9B illustrates an example artificial reality system. In particular embodiments, the artificial reality system may comprise a headset 904, a controller 906, a computing system 908, and a hand-held device 910. A user 902 may use the hand-held device 910 to scan a real-world environment. A user 902 may wear the headset 904 that may display visual artificial reality content to the user 902. The headset 904 may include an audio device that may provide audio artificial reality content to the user 902. The headset 904 may include one or more cameras which can capture images and videos of environments. The headset 904 may include an eye tracking system to determine a vergence distance of the user 902. A vergence distance may be a distance from the user's eyes to objects (e.g., real-world objects or virtual objects in a virtual space) that the user's eyes are converged at. The headset 904 may be referred as a head-mounted display (HDM). The controller 906 may comprise a trackpad and one or more buttons. The controller 906 may receive inputs from the user 902 and relay the inputs to the computing system 908. The controller 906 may also provide haptic feedback to the user 902. The computing system 908 may be connected to the headset 904 and the controller 906 through cables or wireless connections. The computing system 908 may control the headset 904 and the controller 906 to provide the artificial reality content to and receive inputs from the user 902. The computing system 908 may be a standalone host computer system, an on-board computer system integrated with the headset 904, a hand-held device, or any other hardware platform capable of providing artificial reality content to and receiving inputs from the user 902.

Systems and Methods

Figure 10:
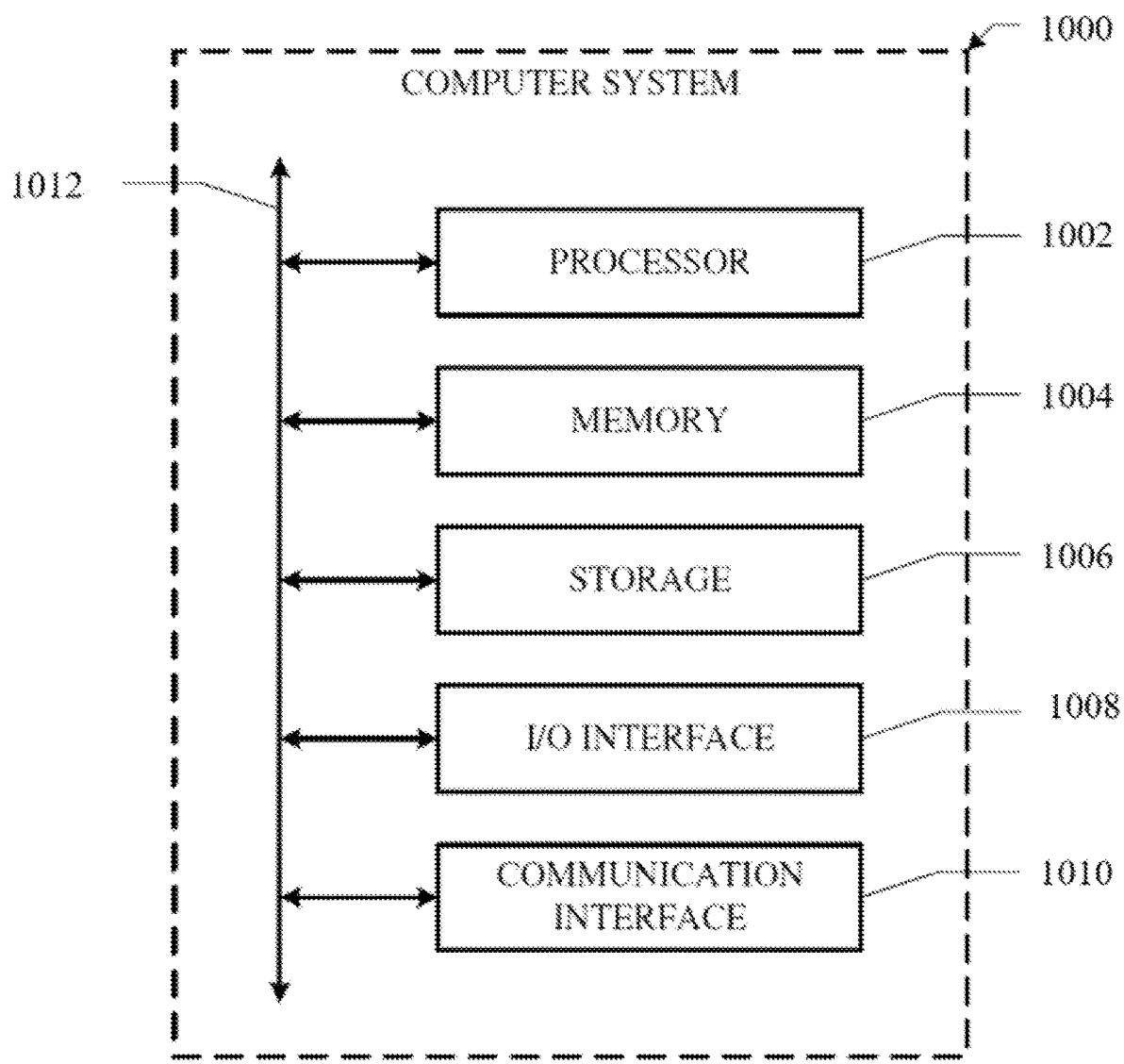
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    obtaining sensor data from a hand-held device associated with a first user, the hand-held device capturing the sensor data by scanning a real-world environment using a first camera and a depth sensor,
        wherein the hand-held device:
            generates, based on the sensor data, a three-dimensional model of the real-world environment, and
            transmits the three-dimensional model to a head-mounted device associated with the first user;
    determining, by the head-mounted device, a pose of the head-mounted device by localizing the head-mounted device within the three-dimensional model based on images captured by a second camera of the head-mounted device;

displaying, on the head-mounted device, a virtual space corresponding to the scanned real-world environment generated based on the three-dimensional model as viewed from the pose;

selecting, by the first user via the head-mounted device, one or more resolutions of one or more portions of the virtual space; and transmitting, to a remote head-mounted device of a second user, data corresponding to A) the three-dimensional model according to the selected one or more resolutions of the one or more portions of the virtual space, and B) the pose of the head-mounted device, the data being configured for rendering, by the remote head-mounted device and based on A) the three-dimensional model and B) the pose of the head-mounted device, the virtual space, according to the selected one or more resolutions of the one or more portions of the virtual space, with a first avatar corresponding to the first user having the pose.

2. The method of claim 1, further comprising:
displaying, on a display of the head-mounted device, the virtual space and a second avatar corresponding to the second user in the virtual space.

3. The method of claim 1, wherein the first avatar moves in the virtual space in coordination with the first user moving in the real-world environment.

4. The method of claim 1, wherein scanning the real-world environment further comprises:
identifying points of interest in the real-world environment, wherein the points of interest are identified based on one or more of: shapes, sizes, colors, physical dimensions, geometries, or textures.

5. The method of claim 1,
wherein the hand-held device further
identifies one or more features in the real-world environment, wherein a first feature in the real-world environment has a first location in the real-world environment, and
wherein the head-mounted device further:
identifies one or more features in the virtual space corresponding to the real-world environment, wherein a first feature in the virtual space has a first location in the virtual space, wherein the first location in the virtual space corresponds to the first location in the real-world environment, and
localizes the head-mounted device by comparing the location of the one or more features in the real-world environment with the one or more features in the virtual space.

6. The method of claim 1,
wherein the remote head-mounted device associated with the second user renders a display of the virtual space using the data corresponding to the three-dimensional model and the pose of the head-mounted device, and
wherein the virtual space is rendered on the remote head-mounted device from the perspective of the second user.

7. The method of claim 1, wherein the second user joins the virtual space as the virtual space is being scanned by the first user using the first camera and the depth sensor of the hand-held device associated with the first user.

8. The method of claim 1, wherein:
the hand-held device associated with the first user provides two or more visualizations of the real-world environment, each visualization having a different level of detail; and the hand-held device associated with the first user receives a selection from the first user indicating a level of detail of the visualization of the real-world environment to share with one or more guest users.

9. The method of claim 1, wherein the real-world environment is initially rendered by the remote head-mounted device at a predetermined level of detail when the first user performs a first scan of the real-world environment, and subsequent scans of a particular area in the real-world environment result in the particular area being rendered at a higher level of detail by the remote head-mounted device.

10. A computing system comprising:
one or more processors; and
one or more memories storing instructions that, when executed by the one or more processors, cause the computing system to perform a processing comprising:
obtain sensor data from a hand-held device associated with a first user, the hand-held device capturing the sensor data by scanning a real-world environment using a first camera and a depth sensor, wherein the hand-held device is configured to:
generates, based on the sensor data, a three-dimensional model of the real-world environment, and
transmits the three-dimensional model to a head-mounted device associated with the first user;
determine, by the head-mounted device, a pose of the head-mounted device by localizing the head-mounted device within the three-dimensional model based on images captured by a second camera of the head-mounted device;
display, on the head-mounted device, a virtual space corresponding to the scanned real-world environment generated based on the three-dimensional model as viewed from the pose;
select, by the first user via the head-mounted device, one or more resolutions of one or more portions of the virtual space; and
transmit, to a remote head-mounted device of a second user, data corresponding to A) the three-dimensional model according to the selected one or more resolutions of the one or more portions of the virtual space, and B) the pose of the head-mounted device, the data being configured for rendering, by the remote head-mounted device and based on A) the three-dimensional model and B) the pose of the head-mounted device, the virtual space, according to the selected one or more resolutions of the one or more portions of the virtual space, with a first avatar corresponding to the first user having the pose.

11. The system of claim 10, wherein the one or more processors are further configured to execute the instructions to display, on the head-mounted device, the virtual space and a second avatar corresponding to the second user in the virtual space.

12. The system of claim 10, wherein the one or more processors are further configured to execute the instructions to move the first avatar in the virtual space in coordination with the first user moving in the real-world environment.

13. The system of claim 10, wherein the one or more processors are further configured to execute the instructions to identify points of interest in the real-world environment, wherein the points of interest are identified based on one or more of: shapes, sizes, colors, physical dimensions, geometries, or textures.

14. The system of claim 10,
wherein the hand-head device is further configured to identify one or more features in the real-world environment, wherein a first feature in the real-world environment has a first location in the real-world environment, and wherein the one or more processors are further configured to execute the instructions to:
identify one or more features in the virtual space corresponding to the real-world environment, wherein a first feature in the virtual space has a first location in the virtual space, wherein the first location in the virtual space corresponds to the first location in the real-world environment, and localize the head-mounted device by comparing the location of the one or more features in the real-world environment with the one or more features in the virtual space.

15. The system of claim 10,
wherein the remote head-mounted device renders a display of the virtual space using the data corresponding to the three-dimensional model and the pose of the head-mounted device, and
wherein the virtual space is rendered on the remote head-mounted device from the perspective of the second user.

16. The system of claim 10, wherein the one or more processors are further configured to execute the instructions to allow the second user to join the virtual space as the virtual space is being scanned by the first user using the first camera and the depth sensor of the hand-held device associated with the first user.

17. The system of claim 10, wherein the one or more processors are further configured to:
execute the instructions to provides two or more visualizations of the real-world environment, each visualization having a different level of detail; and
receive a selection from the first user indicating a level of detail of the visualization of the real-world environment to share with one or more guest users.

18. The system of claim 10, wherein the remote head-mounted device:
renders the real-world environment at a predetermined level of detail when the first user performs a first scan of the real-word environment; and
in response to a subsequent scan of a particular area in the real-world environment, renders the particular area of the real-world environment at a higher level of detail than the predetermined level of detail.

19. A computer-readable storage medium storing instructions that, when executed by a computing system, cause the computing system to perform a process comprising:
obtaining sensor data from a hand-held device associated with a first user, the hand-held device capturing the sensor data by scanning a real-world environment using a first camera and a depth sensor,
wherein the hand-held device:
generates, based on the sensor data, a three-dimensional model of the real-world environment, and
transmits the three-dimensional model to a head-mounted device associated with the first user;
determining, by the head-mounted device, a pose of the head-mounted device by localizing the head-mounted device within the three-dimensional model based on images captured by a second camera of the head-mounted device;
displaying, on the head-mounted device, a virtual space corresponding to the scanned real-world environment generated based on the three-dimensional model as viewed from the pose;
selecting, by the first user via the head-mounted device, one or more resolutions of one or more portions of the virtual space; and
transmitting, to a remote head-mounted device of a second user, data corresponding to A) the three-dimensional model according to the selected one or more resolutions of the one or more portions of the virtual space, and B) the pose of the head-mounted device, the data being configured for rendering, by the remote head-mounted device and based on A) the three-dimensional model and B) the pose of the head-mounted device, the virtual space, according to the selected one or more resolutions of the one or more portions of the virtual space, with a first avatar corresponding to the first user having the pose.

20. The computer-readable storage medium of claim 19, wherein the process further comprises:
displaying, on a display of the head-mounted device, the virtual space and a second avatar corresponding to the second user in the virtual space.

* * * * *